(12) United States Patent
Paes

(10) Patent No.: US 9,965,904 B2
(45) Date of Patent: May 8, 2018

(54) TIME-MEASURING SYSTEM

(71) Applicant: Wolfgang Alexander Paes, Stein am Rhein (CH)

(72) Inventor: Wolfgang Alexander Paes, Stein am Rhein (CH)

(*) Notice: Subject to any disclaimer, the term of this patent is extended or adjusted under 35 U.S.C. 154(b) by 89 days.

(21) Appl. No.: 15/116,558

(22) PCT Filed: Jan. 28, 2015

(86) PCT No.: PCT/EP2015/000157
§ 371 (c)(1),
(2) Date: Oct. 24, 2016

(87) PCT Pub. No.: WO2015/117735
PCT Pub. Date: Aug. 13, 2015

(65) Prior Publication Data
US 2017/0039781 A1    Feb. 9, 2017

(30) Foreign Application Priority Data

Feb. 7, 2014  (DE) .................. 10 2014 001 544
Oct. 24, 2014  (DE) .................. 10 2014 015 689

(51) Int. Cl.
*G04F 10/00* (2006.01)
*G04F 13/02* (2006.01)
(Continued)

(52) U.S. Cl.
CPC .............. *G07C 1/24* (2013.01); *G01V 8/22* (2013.01); *G01V 11/00* (2013.01); *G04F 10/00* (2013.01); *G04F 13/02* (2013.01); *G07C 1/22* (2013.01)

(58) Field of Classification Search
CPC .......... G04F 10/00; G04F 13/02; G07C 1/20; G07C 1/22; G07C 1/24; A63B 69/0028;
(Continued)

(56) References Cited

U.S. PATENT DOCUMENTS 4,074,117 A * 2/1978 DeLorean .............. G04C 23/50
                                                  340/323 R
4,645,458 A * 2/1987 Williams ........... A63B 69/0053
                                                  273/446
(Continued)

FOREIGN PATENT DOCUMENTS

DE      29 47 135 A1    6/1980
WO   WO 2005/005000 A1  1/2005

OTHER PUBLICATIONS

International Serach Report and Written Opinion from International Application No. PCT/EP2015/000157 dated Sep. 23, 2015.

*Primary Examiner* — Vit W Miska
(74) *Attorney, Agent, or Firm* — Alston & Bird LLP

(57) ABSTRACT

The invention relates to a time-measuring system for measuring the running time of a runner (2) comprising, for sensing the presence of the runner on a presence line (3, 4.3) crossing the running track, a signaling device (5), which has a light-beam source (6) and a light-beam receiver (7), ahead of the running track (4) and, in the light beam oriented parallel to the running track, a reflector (10). The reflector comprises a deflecting mirror (10.1) and an end mirror (10.2). Both are positioned on the presence line (3) on different sides of the running track (4) in the horizontal plane of the light beam of the light-beam source (6) (light-beam plane) and are oriented in the manner of a prism in two vertical planes in such a way that the light beam crosses the running track (3) between the two mirrors at a substantially right angle and is reflected to the light-beam receiver (7).

7 Claims, 3 Drawing Sheets

(51) Int. Cl.
  *G07C 1/22*   (2006.01)
  *G07C 1/24*   (2006.01)
  *G01V 8/22*   (2006.01)
  *G01V 11/00*  (2006.01)

(58) Field of Classification Search
  CPC ...... A63B 71/06; A63B 71/0686; G01V 8/22; G01V 11/00
  See application file for complete search history.

(56) References Cited

U.S. PATENT DOCUMENTS

| | | | | |
|---|---|---|---|---|
| 5,241,487 | A * | 8/1993 | Bianco | G04F 8/08 340/323 R |
| 7,508,739 | B2 * | 3/2009 | Paes | A63B 69/0028 235/377 |
| 9,375,627 | B2 * | 6/2016 | Hansen | G07C 1/24 |
| 9,495,568 | B2 * | 11/2016 | Hansen | G07C 1/24 |
| 2007/0258333 | A1 * | 11/2007 | Paes | A63B 69/0028 368/9 |
| 2012/0082007 | A1 | 4/2012 | Duxbury | |

\* cited by examiner

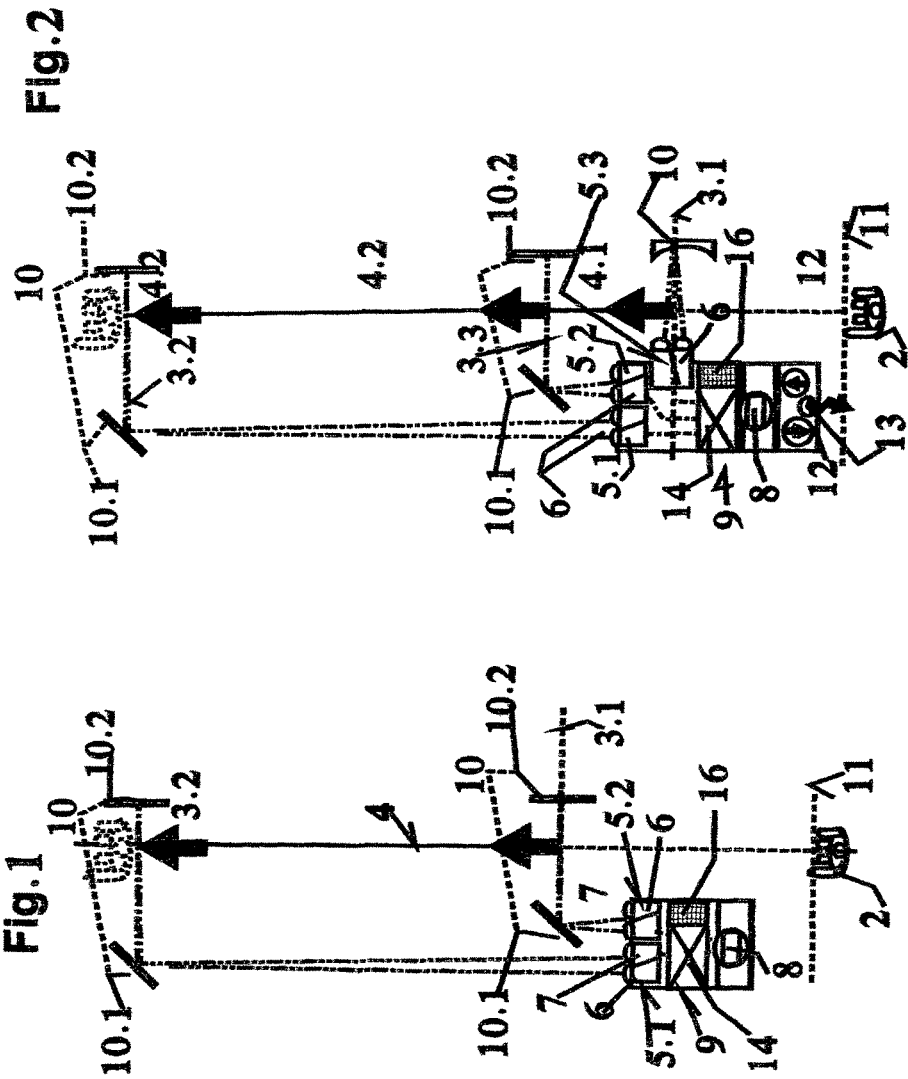

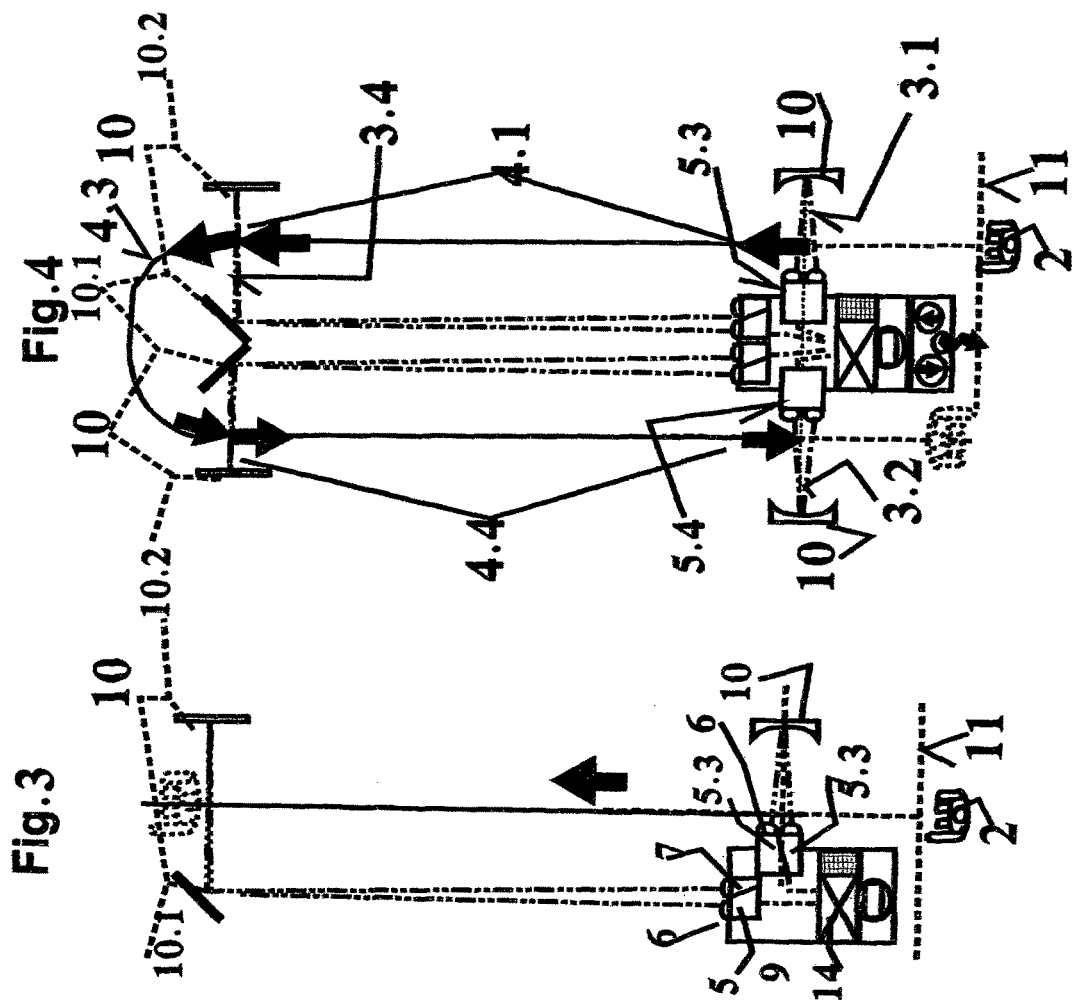

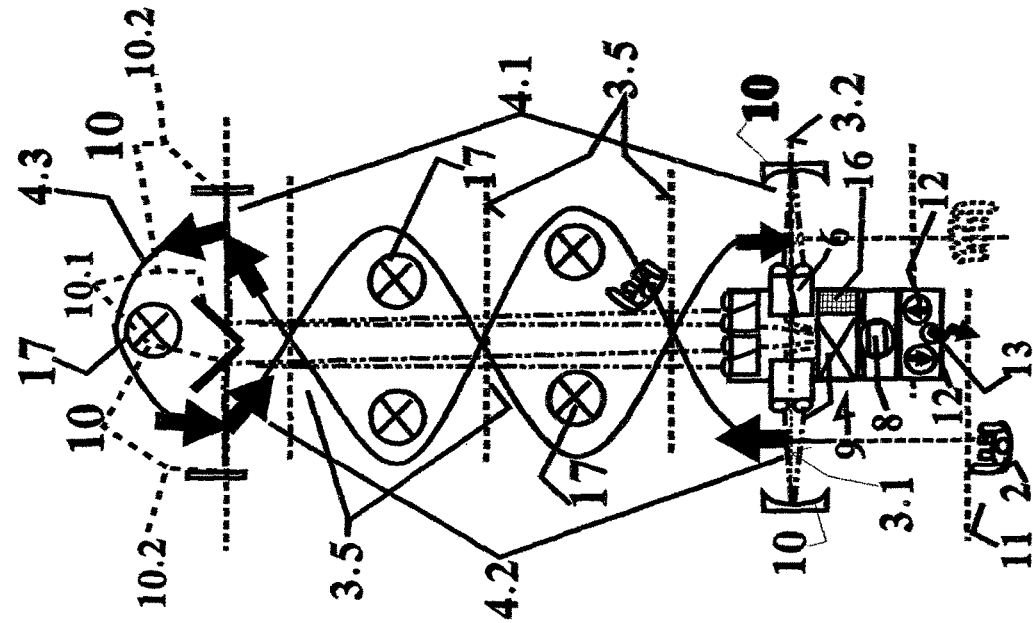
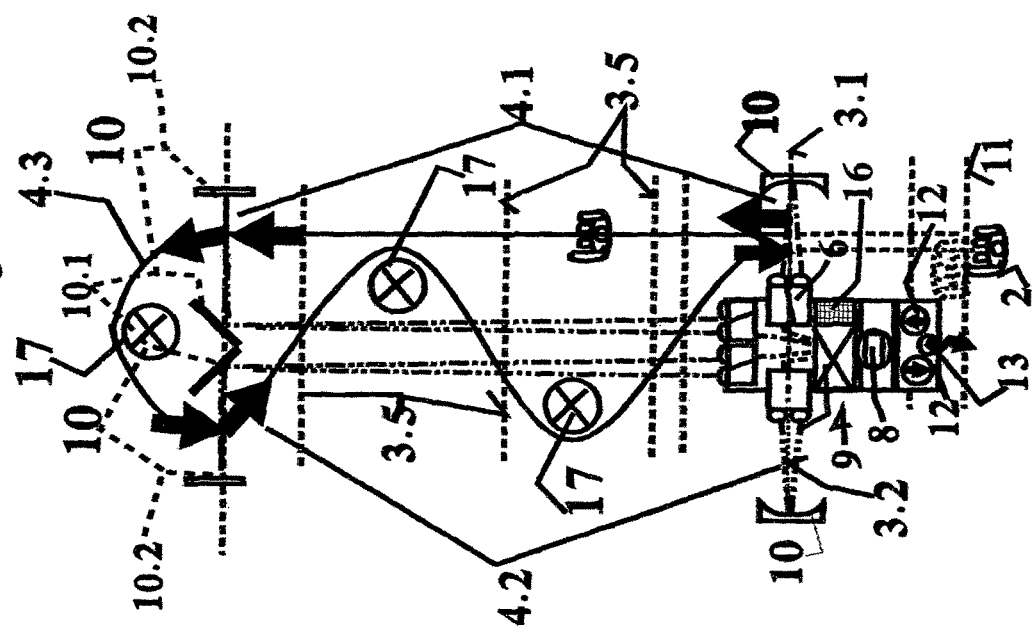

TIME-MEASURING SYSTEM

CROSS-REFERENCE TO RELATED APPLICATION

This application is a national stage application filed under 35 U.S.C. 371 of International Application No PCT/EP2015/000157, filed Jan. 28, 2015, which claims priority from German Patent Application No. 10 2014 001 544.0, filed Feb. 7, 2014, and German Patent Application No. 10 2014 015 689.3, filed Oct. 24, 2014, each of which is incorporated by reference herein in its entirety.

BACKGROUND/BRIEF SUMMARY

The invention relates to a timing system for measuring the running time of a runner. Such a timing system is known from EP 1 646432 81, in which, in a running competition, a presence signal of the runner is generated at the presence points of a pre-specified running path, for example the start signal and the finish signal. For this purpose, a light source is placed at each presence point, intersecting the running path perpendicular to the same, and arriving at a reflector which reflects the light beam back to the light source—that is, a light beam receiver. If the light beam is interrupted, the light beam receiver generates a presence signal. This signal is transmitted as a measurement pulse, via a radio device placed in the region of the signal generator, to a timer placed at the head of the running path, and serves at that point as a switching signal, said timer being started or switched off by the same.

This timing system has the disadvantage that, for the purpose of detecting the presence of a runner (2), a light barrier consisting of a light beam source with a constant or a constantly pulsating beam of light, a light beam receiver, and a reflector, must be arranged at each of the presence lines which intersect the running path, and must be connected to the centrally arranged timer to transmit the switching signal. As a result, a considerable expenditure of time is required to set up a running course having such a timing system, and it is necessary to properly train personnel tasked with the installation and the operation of the timer to prevent errors.

The problem addressed by the invention is that of creating a timing system which can be set up in little time, and also requires no electrical installations or adjustments for which training and monitoring is necessary for proper execution, which can particularly be carried out or monitored in school by the teaching staff with little effort.

The solution includes a timing system for timing the running time of a runner on a running path between two presence lines which intersect the running path, having detection devices for detecting the presence of the runner at each of the presence lines, wherein said detection devices comprise:

a light beam source, the constant or constantly pulsating light beam of which is oriented along the presence line and intersects the running path on a measurement axis which is perpendicular to the presence line, a reflector which is arranged in the light beam and reflects the light beam as the measurement beam along the presence line, a measurement beam receiver (light beam receiver) which is arranged in the direction of the reflected measurement beam on the presence line, which generates a presence signal of the runner when the receipt of the measurement beam is interrupted, which is transmitted to the timer of the timing system as a switching signal, wherein the light beam source (6) and the light beam receiver (7) are structurally unified to create a signal pairing (5). According to the invention, an assembly which contains the timing system is placed before the head of the running path, and the running path is laid out in such a manner that all signal pairings (each consisting of a light beam source and a light beam receiver) which are required to detect the presence of the runner at the pre-specified presence lines are integrated into the assembly and are arranged on at least one external side of the assembly which faces the running path, in particular in the embodiment according to claim 1.

In this timing system, all electrically operated parts can be set up centrally, and preferably are integrated into one assembly.

For the electrical setup of the running course, it is only necessary to set up the pairing of the light beam source and the light beam receiver before the head of the running course—that is, centrally—with the light beam oriented parallel to the running course and switched on electrically. In addition, no cabling is required in a configuration with battery operation. In addition, it is only necessary to set up, at all of the presence lines where the presence of the runner should be detected and should be made the object of a time measurement, the reflectors—i.e., in each case one deflecting mirror and one end mirror. This is a purely mechanical activity that does not require precise knowledge of the time measurement technology. The adjustments required for the timing can be undertaken at an input device of the head station by a switch, a keyboard, or the like. The head station can also include a computer and a memory.

The assembly also has the advantage that the setup and arrangement of the light beam sources and light beam receivers are also predetermined, and therefore can be carried out with no special prior knowledge. With an appropriate configuration of this assembly, in this application called a head station, it is possible to pre-specify several different running courses and games. The timing system is particularly suitable for schools, where at different times game applications or sports applications are desired, and it is always possible to provide variety and interest by varying the running courses. These advantages can particularly be realized in one embodiment of the present invention. Embodiments of the invention are characterized by multiple basic arrangements and designs of the head station, and therefore the running courses to be set up.

In this case, by means of a suitably equipped head station, it is possible to stake out running courses with different lengths, different routes, and different time requirements, the entire running course between the start and finish; running courses comprising course segments.

The running courses can extend in a direction or be folded into a U-shape. The running courses can be straight (FIGS. 1-4) or zigzag and/or serpentine.

In addition to the signal generators lying on the front side of the head station, lateral signal generators with a light beam source and a light beam receiver can also be attached to one or both of the sides of the head station facing the running course in order to attain more options for varying the running courses. In this case, the reflectors are simple mirrors which are situated on the other side of the running course and pointed directly at the respective signal generator.

The settings required at the head station can be programmed in advance so that only the required settings program need be called up by the input device/keyboard. In this case, test runs can also be pre-programmed so that when a certain running program is called up, the settings of the required presence lines, with the correct placement of the reflector systems, each with a deflecting mirror and a cooperating end mirror, can be automatically monitored and verified at the head station.

Thus, the invention focuses on the setup of a running path at the head station—i.e., the placement and setup thereof—without requiring the placement and cabling or other electrical connections to other electrical devices for this purpose.

BRIEF DESCRIPTION OF THE SEVERAL VIEWS OF THE DRAWING(S)

In the following, embodiments of the invention are described with reference to the drawings, wherein:

FIGS. 1-6: show different equipment of timing systems with examples of running courses which can be set-up with the same.

DETAILED DESCRIPTION

In the following, functionally identical parts are provided with the same reference numerals. The following description applies equally to all embodiments shown, aside from special features addressed in an individual embodiment.

The timing system in its basic configuration comprises a beam source 6.2 as the light beam source LSG, a light beam receiver 5, and a data processing device (computer), including timing circuit and input means, for example a keyboard and switch. A laser beam source with a light beam which is sufficiently energetic and tightly focused, such that it is possible to prevent faulty measurements due to light scattering, can be contemplated as the light beam source.

The head station is a box or a rectangular housing 9. It is placed in the region of the starting line 10 and the standby line 11. The runner 2 waits outside or this area in front of the standby line 11.

The head station 9 comprises one or more units, referred to as signal generators 5, and comprising a light beam source 6 and a light beam receiver 7, both of which are directed in the running direction. Such assemblies are commercially available. These are light beam sources which can emit and receive continuous or pulsing light beams—primarily laser beams. An electrical signal is produced as a result of the receipt, or the interruption of the receipt (negative pulse), which can be relayed to the computer for further processing, and, with appropriate programming of the computer, can be passed on to the timer as a start signal or stop signal.

The signal generators 5 are preferably mounted in the head station in such a manner that the light beam source 6 and light beam receiver 7 lie horizontally next to each other and the transmitted and the received light beam lie in a horizontal plane, the light beam plane.

Opposite them in the light beam plane lies the reflector system—generally termed "reflector 10" in this application. The reflector consists of a deflecting mirror 10.1, placed approximately beside the running course and the end mirror 10.2 on the other side of the running course.

The reflector 10 performs the task, as a result of these two mirrors being placed on a presence line, of directing the beam of light emitted in the direction of and/or parallel to the running course to the presence lines and sending the reflected return beam back to the light beam receiver 7 parallel to the emitted light beam.

For this purpose, the two mirrors of the reflector system are set up on the presence line in the horizontal light beam plane and oriented in vertical planes in a prism-like manner to each other. The light beam source 6 is therefore directed to the deflecting mirror 10.1. The vertical plane of the deflecting mirror 10.1 forms an angle of 45° with the incoming light beam in the light beam plane. Thus, the light beam reflected by it intersects the running course substantially at an angle of 90° and strikes the end mirror 10.2. The vertical plane of the end mirror 10.2 is on the other side of the running path and forms an angle of 90° with the light beam deflected into the presence line in the light beam plane. This means that the light beam incident on the presence line is reflected back in the same direction to the deflecting mirror 10.1, and from the same to the light beam receiver 7. The light beam therefore intersects the running course two times between the deflecting mirror 10.1 and the end mirror 10.2. If the light beam between the deflecting mirror 10.1 and the end mirror 10.2, or between the signal generator 5 and the reflector system, is interrupted by the runners passing on the running course, this negative pulse is used, as depicted—to establish a time point of the run.

As such, one reflector 10, comprising a deflecting mirror 10.1 and end mirror 10.2, is arranged at each presence line 3, as long as the presence line lies before the head station in the running direction. If the presence line lies abreast of the head station, as can particularly be the case for the start and/or finish line, the signal generator 5 with the light beam source 6 and the light beam receiver 7 is attached to the side and oriented perpendicular to the running course. In this case, the reflector consists only of one end mirror which is positioned on the other side of the running course and throws back the light beam directly to the associated light beam receiver.

In this application, a line at which the runner will be detected when running on the running course, for the purpose of recording time, is termed a presence line. Therefore, the start line 3.1 is an essential presence line, and the finish line 3.2 is another. In addition, course segments 4.1, 4.2 or 4.3, or the return path of the entire running course, can also be marked by presence lines to detect partial and split times.

If the runner intersects a presence line, the intersecting light beam is interrupted briefly. This means that the light beam receiver 7 receives no signal. This negative pulse is detected by a computer, microprocessor 14 installed in the head station 9, and relayed as a start signal or stop signal or split signal to the timer 8, which is also part of the computer capacity and is integrated into the head station in a manner which is visible from the outside. The computer 14 also includes input devices, in particular a keyboard 16. In addition, the computer capacity also includes a memory. Therefore, entries can be made to program different running courses and to set up the corresponding running courses and specify the meaning of the individual signals.

It is also very advantageous if the head station includes a printer via which the runner can be informed of the length and the route of the running course and the running time, and potentially the split times.

The timing system according to FIG. 1 shows that in such a head station 9, two signal generators 5 are integrated on the front side of the head station, each with a light beam source 6 and a light beam receiver 7. Both are oriented towards the running course 4 and arranged slightly beside the running path. The right signal generator 5.2 works together with a reflector 10 which includes a deflecting mirror 10.1 and end mirror 10.2, the same arranged on the first presence line, the start line 3.1. The left signal generator 5.1 works together with a reflector 10 which includes a deflecting mirror 10.1 and end mirror 10.2, the same arranged on a second presence line, the finish line 3.2. In both cases, the deflected light beams intersect the running course 4 at an angle of 90°.

To set up this running path, the head station 9 is erected shortly before the planned start line 3.1 and oriented with the signal generators to the planned start line 3.1 and finish line 3.2. Then, by means of the keyboard 16, a program is called up which directs the right signal generator 5.2 to start the timer 8, and the left signal generator 5.1 to stop the timer.

The runner 2 takes his place before the start of his run on the standby line 11, and triggers by his presence on the starting line 3.1 the starting signal for the timer 8, and the stop signal by his presence at the finish line 3.2.

The determined time can be made visible on a display of the timer 8 and/or printed on a printer, by way of example.

The timing system of FIG. 2 has a head station 9, which likewise has two signal generators 5.1 and 5.2 oriented in the running direction, but in addition also has a lateral signal generator 5.3. Opposite the lateral signal generator 5.3, a reflector 10 is set up—in this case, a simple mirror—which is oriented toward the light beam receiver 7 of the lateral signal generator 5.3. This right-hand signal generator 5.3 detects the presence of the runner on the starting line 3.1, which is at the same height as the head station 9.

The left signal generator 5.1 placed before the head detects the presence of the runner at the finish line 3.2. The second signal generator 5.2 lying on the right before the head homes on an intermediate presence line 3.3 by which the entire running course 4 is divided into two sections 4.1 and 4.2.

To set up such a running course, the head station 9 is placed somewhat beside the running course and in such a manner that the lateral signal generator 5.3 lies on the start line 3.1 and intersects with its light beams the running path 4 of the runner 2 at a perpendicular angle. In addition, the setup of the running course requires few simple manual operations to place one reflector and/or one reflector pairing 10 of a deflector mirror 10.1 and end mirror 10.2 at each of the desired presence lines 3.1, 3.2 and 3.3. A switching device may be included at the head station, via which the light beam source 6 is briefly switched into operation, and a determination is made, based on a control light of the associated light beam receiver 7 as to whether the reflectors are placed properly. The side right reflector 10 can be checked in the same way. Then a pre-entered program is called up at the head station 9 through the keyboard 16, via which the negative pulses of the light beam receiver 5.3 of the lateral signal generator 5.3 serve to start the timer 8, the negative pulses of the right signal generator 5.3 serve to capture an interval, and the negative pulses of the left signal generator 5.1 serve to capture the total time.

Here as well, the runner 2 waits at the standby line.

The head station 9 in this embodiment includes, in addition to the signal generators 5 and the timer 8, also a standby light 13 to emit a standby signal for the waiting runner. This standby light 13 is also connected to the timer 8 to relay the standby service signal.

The embodiment according to FIG. 3 shows a very simple design. Only at the starting line 3.1, there is a lateral signal generator 5.3 and, before the head of the head station 9, a signal generator 5, each with a light beam source 6 and light signal receiver 7. The details of this configuration, in particular the function of the individual elements as well as the setup and placement of the head station, have already been described.

FIG. 4 shows a timing system which is suitable for detecting the total time and the split times of a U-shaped folded running course.

The special features thereof are as-follows. Two lateral signal generators are present at 5.3 right and 5.4 left with the corresponding reflectors 10. The head station 9 is set-up in such a manner that these signal generators 5.3 and 5.4, with their reflectors 10, lie at the start and finish line, wherein the light beams are oriented in opposite directions. The light beam receiver 7 of the right-hand signal generator 5.3 detects the presence of the runner 2 on the start line 3.1. That is, at the start, the light beam receiver 7 of the left-side signal generator detects the presence of the runner at the finish line 3.2.

The running course consists of an outward leg 4.1, a return path 4.2, and the turnaround segment 4.3.

A light system with the direction light 12 shows the waiting runner, through a right signal or a left signal, the side on which the running course begins, and that the start is soon—and furthermore, by the standby signal of the standby light 13, that he must start running. As a result, it is possible to determine the reaction time of the runner—i.e., the time interval between the standby signal and the presence on the start line 3.1. A head station 9 in the configuration according to FIG. 4 is used to set up the running course according to FIG. 5. However, the left lateral signal generator 5.4 is not used, such that there is no reflector in this location. A folded running path is set up, as shown in principle in FIG. 4. However, the running path is routed in such a manner that the start and finish are located, in this case, on the same side of the head station 9 and are detected by the right signal generator 5.3 and the associated reflector. The running course comprises an outward leg 4.1 between the start line 3.1 and the first turnaround line 3.4, the turnaround segment 4.3 between the first and the second turnaround line 3.4, and the return path 4.2. The same has a serpentine shape. The runner has to run around the pylons 17, which are set up on both sides of the light beams of the signal generators 5.2 and 5.3 oriented parallel to the running course. Then the runner must return to the finish line 3.2 on the right side of the head station 9. It can be seen that even on the return path 4.2, negative pulses are received by the light beam receiver 7 of the signal generator 5.2 and 5.3 when the runner intersects the light beams of the signal generator 5.2 and/or 5.3. This results in the possibility of capturing additional split times at the pre-programmed presence lines 3.5 of the individual inflection points.

It can be seen that, rather than the return path, the outward leg can also run in a serpentine fashion. FIG. 6 illustrates that the outward leg and the return path run in a serpentine fashion. The runner must run around pylons 17 on the running course 4 such that he passes the head station 9 on the right on the outward leg (in FIG. 6), and on the left on the return path, and—starting and ending at the start/finish line 3.1, 3.2—follows a wavy running path around the pylons 17 both on the outward leg and on the return path, and turns around between the turnaround lines 3.4.

In this routing of the running path, the left lateral signal generator 5.4 is also used, and the reflector 10 is also set-up there, because in this case the start line 3.2 is on the left side of the head station 9 where the runner therefore starts. The finish is to the right of the head station. The runner is detected at this point by the right-side signal generator when he reaches the finish line 3.2.

The invention and its importance are clear from these examples of running courses—particularly that, merely as a result of the equipment, programming, suitable positioning, and adjustment of the head station, it is possible without further electrical installations, apart from the purely mechanical placement of the reflectors, to specify a plurality of running courses.

The invention claimed is:

1. A timing system for detecting the presence of a runner at a presence line which intersects the running path, said timing system comprising: a light beam source, the constant or constantly pulsing light beam of which intersects the running path at the presence line, a reflector, which is arranged at the side of the running courses in the measurement beam and reflects the light beam as a measurement beam, a measurement beam receiver which is arranged in the direction of the reflected measurement beam and which generates a presence signal of the runner when the receipt of the measurement beam is interrupted, a timer to which the presence signal is transmitted from the measurement beam receiver as a switching signal, wherein a pairing of a light beam source and a light beam receiver is arranged, together, before the head of the running path in such a manner that the light beam is oriented parallel to the running path, and wherein the reflector comprises a deflecting mirror and an end mirror which are placed at the presence line on different sides of the running path in the horizontal plane of the light beam of the light beam source, and oriented in two vertical planes in a prism-like manner such that the light beam intersects the running course between the two mirrors substantially at a right angle, and is reflected back to the light beam receiver.

2. The timing system particularly according to claim 1, wherein the measurement devices, including the timer and the at least one pairing of, in each case, a light beam source and a light beam receiver are installed in a head station designed as an assembly which can be placed directly laterally beside the running path in the region of one end of the running path.

3. The timing system according to claim 1, wherein multiple presence lines are arranged along the running path, each with a reflector, each with a deflecting mirror and an end mirror, and wherein two pairings, each of which comprises a light beam source and a light beam receiver, are arranged in the head station in such a manner that one light beam is directed to one deflecting mirror in each case.

4. The timing system according to claim 3, wherein, in the case of a running path between a start and a finish which is remote from the start, the start and finish are each marked by a presence line, each of which has a reflector, each with a reflecting mirror and ES, and wherein two pairings, each of which has a light beam source and a light beam receiver, are arranged in the head station in such a manner that each light beam is directed to one deflecting mirror in each case.

5. The timing system according to claim 2, wherein, in a running course which is folded at a turnaround point, the start and the finish are marked by a single presence line, on which the head station can be placed between the outward leg and the return path, and wherein the turnaround point is marked by a presence line having two reflectors, each with a reflecting mirror and an end mirror, wherein in each case one of the deflecting mirrors lies in one of the light beams between the outward leg and the return path, and the associated end mirror in each case lies on the other side of the outward leg and/or return path, and wherein two pairings, each of which has a light beam source and a light beam receiver, are arranged in the head station in such a manner that the LSs are oriented between the outward leg and the return path and parallel to the same.

6. The timing system according to claim 2, wherein, for a running course, the start is marked by a presence line, wherein the head station is arranged on the same at the side of the running course, and wherein the head station contains the timer and at least one pairing, in each case of a light beam source and a light beam receiver, the light beam of which is directed to a mirror which is situated at the presence line, but on the other side of the running path.

7. The timing system according to claim 5, wherein, in a running course which is folded at a turnaround point, the start and the finish are marked by a single presence line, on which the head station can be placed between the outward leg and the return path, and wherein the head station has, on its side which faces the outward leg, a pairing of a light beam source and a light beam receiver, and on its side which faces the return path, has a second pairing of a light beam source and a light beam receiver, and wherein each of the light beams is directed to a different mirror which is located on the presence line, but on the other side of the outward leg and/or return path of the running path.

* * * * *